United States Patent
Yu et al.

(10) Patent No.: US 10,424,807 B2
(45) Date of Patent: Sep. 24, 2019

(54) FUEL CELL SYSTEM AND FUEL CELL STACK HOUSING

(71) Applicants: HYUNDAI MOTOR COMPANY, Seoul (KR); KIA MOTORS CORPORATION, Seoul (KR)

(72) Inventors: Jung Han Yu, Yongin-si (KR); Yong Suk Heo, Seoul (KR); Duck Whan Kim, Seongnam-si (KR); Kwi Seong Jeong, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 239 days.

(21) Appl. No.: 15/689,772

(22) Filed: Aug. 29, 2017

(65) Prior Publication Data

US 2018/0166731 A1 Jun. 14, 2018

(30) Foreign Application Priority Data

Dec. 13, 2016 (KR) ........................ 10-2016-0169639

(51) Int. Cl.
*H01M 8/2475* (2016.01)
*H01M 8/04082* (2016.01)
*H01M 8/04111* (2016.01)
*H01M 8/04014* (2016.01)
*H01M 8/04089* (2016.01)

(52) U.S. Cl.
CPC ..... *H01M 8/2475* (2013.01); *H01M 8/04014* (2013.01); *H01M 8/04089* (2013.01); *H01M 8/04111* (2013.01); *H01M 8/04201* (2013.01)

(58) Field of Classification Search
CPC combination set(s) only.
See application file for complete search history.

(56) References Cited

U.S. PATENT DOCUMENTS

| 3,473,963 | A | * | 10/1969 | Sanderson | ........ | H01M 8/04014 |
|---|---|---|---|---|---|---|
| | | | | | | 429/410 |
| 6,395,414 | B1 | * | 5/2002 | Clingerman | ...... | H01M 8/04022 |
| | | | | | | 429/429 |
| 6,773,837 | B1 | * | 8/2004 | Kai | .................. | H01M 8/04223 |
| | | | | | | 429/430 |

(Continued)

FOREIGN PATENT DOCUMENTS

| KR | 10-0355370 B1 | 3/1996 |
|---|---|---|
| KR | 10-0915081 B1 | 9/2009 |
| KR | 10-1534922 B1 | 7/2015 |

*Primary Examiner* — Kaity V Chandler
(74) *Attorney, Agent, or Firm* — Morgan, Lewis & Bockius LLP (57) ABSTRACT

A fuel cell system includes a fuel cell stack including an air electrode and a fuel electrode, a stack housing having a hollow therein to accommodate the fuel cell stack in the hollow, an air compressor configured to pump air to supply the air to the air electrode, a ventilation pipe connecting an entrance of the air compressor and the hollow, and at least one vent hole provided on an outer wall of the stack housing such that the hollow and an outside of the stack housing communicate with each other. An interior of the stack housing is ventilated by lowering of a pressure at the entrance of the air compressor, which is generated as the air compressor is operated, while air outside the stack housing is suctioned into the entrance of the air compressor after passing through the vent hole, the hollow, and the ventilation pipe.

13 Claims, 10 Drawing Sheets

(56) References Cited

U.S. PATENT DOCUMENTS

| | | | | |
|---|---|---|---|---|
| 8,268,470 B2* | 9/2012 | Matsumoto | ............ | B60K 11/06 180/309 |
| 2005/0136303 A1* | 6/2005 | Kobayshi | ............ | H01M 8/0267 429/413 |
| 2006/0257707 A1* | 11/2006 | Kaschmitter | ..... | H01M 8/04216 429/412 |
| 2008/0193887 A1* | 8/2008 | Hamada | .................. | F23C 13/00 431/328 |
| 2008/0268313 A1* | 10/2008 | Hirayama | ......... | H01M 8/04007 429/421 |
| 2009/0087708 A1* | 4/2009 | Yamashita | ........ | H01M 8/04029 429/408 |
| 2009/0136791 A1* | 5/2009 | Ogawa | .............. | H01M 8/04089 429/431 |
| 2009/0191805 A1* | 7/2009 | Cusumano | .............. | H01M 8/04 454/158 |
| 2010/0209797 A1* | 8/2010 | Katano | ............ | H01M 8/04089 429/454 |
| 2011/0020715 A1* | 1/2011 | Shinoda | ............ | H01M 8/04014 429/410 |
| 2011/0045369 A1* | 2/2011 | Nuessle | .............. | H01M 8/0444 429/428 |
| 2013/0034795 A1* | 2/2013 | Matsumoto | ......... | H01M 8/2475 429/482 |
| 2015/0079486 A1 | 3/2015 | Lee et al. | | |
| 2016/0056482 A1* | 2/2016 | Otsuka | ................ | H01M 8/0438 180/220 |
| 2016/0126570 A1* | 5/2016 | Nagai | .............. | H01M 8/04097 137/560 |
| 2016/0226084 A1 | 8/2016 | Itoga | | |
| 2017/0155160 A1* | 6/2017 | Boehm | .............. | H01M 8/2475 |

* cited by examiner

FUEL CELL SYSTEM AND FUEL CELL STACK HOUSING

CROSS-REFERENCE TO RELATED APPLICATION

This application is based on and claims the benefit of priority to Korean Patent Application No. 10-2016-0169639, filed on Dec. 13, 2016, with the Korean Intellectual Property Office, the disclosure of which is incorporated herein in its entirety by reference.

TECHNICAL FIELD

The present disclosure relates to a fuel cell system and a fuel cell stack housing.

BACKGROUND

A fuel cell is an apparatus that converts chemical energy stored in a hydrocarbon or a hydrogen fuel to electrical energy through an electrochemical reaction with air. A polymer electrolyte fuel cell (PEFC) used in vehicles or the like is a fuel cell that uses a polymer as an electrolyte, and is operated at a temperature of not more than 100° C. Hydrogen ions produced by an anode of a fuel cell stack flows to a cathode through an electrolyte, and generates electricity while reacting with oxygen in the cathode to generate water.

Then, the fuel cell stack may be accommodated in a stack housing, and an inside and an outside of the fuel cell stack may be partitioned such that materials in the interior of the stack housing are not leaked to the outside. However, some moisture or hydrogen may be leaked to the outside of the fuel cell stack and be accommodated in the stack housing.

Further, a process of generating electricity in the fuel cell stack is a heat emitting reaction, and accordingly, moisture may be condensed in the interior of the stack housing due to a temperature difference between the inside and the outside of the stack housing.

If moisture is condensed in the interior of the stack housing, components of the fuel cell stack may be corroded. Accordingly, fuel cell systems for reducing moisture in the fuel cell stack is necessary.

SUMMARY

The present disclosure provides a fuel cell system and a fuel cell stack housing that may prevent moisture from being condensed in the interior of the fuel cell stack housing.

The present disclosure also provides a fuel cell system that may prevent moisture in the interior of a stack from being condensed, by preventing moisture and foreign substances from being introduced into the stack, and may prevent damage of components of the fuel cell system during an operation of the fuel cell system.

The technical objects of the present disclosure are not limited to the above-mentioned one, and the other unmentioned technical objects will become apparent to those skilled in the art from the following description.

In accordance with an aspect of the present disclosure, a fuel cell system is provided to include a fuel cell stack including an air electrode and a fuel electrode, a stack housing having a hollow therein to accommodate the fuel cell stack in the hollow, an air compressor configured to pump air to supply the air to the air electrode, a ventilation pipe connecting an entrance of the air compressor and the hollow, and at least one vent hole provided on an outer wall of the stack housing such that the hollow and an outside of the stack housing communicate with each other, wherein an interior of the stack housing is ventilated by lowering of a pressure at the entrance of the air compressor, which is generated as the air compressor is operated, while air outside the stack housing is suctioned into the entrance of the air compressor after passing through the vent hole, the hollow, and the ventilation pipe.

In another example, the fuel cell system may further include a ventilation filter coupled t the stack housing at a location corresponding to a location of the vent hole, and the ventilation filter may prevent liquid and foreign substances from being introduced from the outside of the stack housing to the hollow.

In another example, the ventilation pipe and the vent hole may be located on opposite sides of the fuel cell stack while the fuel cell stack being located therebetween, such that exterior air passes by the fuel cell stack while passing through the hollow.

In another example, the fuel cell system may further include at least one branch pipe connecting the entrance of the air compressor and the hollow, and a ventilation valve provided between the hollow and the branch pipe to open and close a passage between the branch pipe and the hollow, and the ventilation valve may open the passage if the air compressor is not operated, and may close the passage if the air compressor is operated.

In another example, the ventilation valve may include a closing part configured to move towards the branch pipe by lowering of the pressure at the entrance of the air compressor, which is generated as the air compressor is operated, to close the passage, and a restoring part configured to move the closing part in an opposite direction to a direction, in which the closing part moves to close the passage, to open the passage if the air compressor is not operated.

In another example, the closing part may include a movable member having a flat plate-shape and having a width that is larger than a width of the branch pipe, a pressed member extending from the movable member towards the branch pipe, and an interruption member formed on a surface of the movable member, which is close to the branch pipe, or in an area of an inner surface of the stack housing, which meets the movable member when the movable member is moved towards the branch pipe, to interrupt the passage.

In another example, the restoring part may include a resilient member compressed as the pressed member is moved towards the branch pipe if the air compressor is operated, and restored if the air compressor is not operated to move the pressed member in the opposite direction to the direction in which the closing part moves to close the passage, and a support member formed in an interior of the branch pipe to support the resilient member.

In another example, the ventilation filter may include a filter member configured not to allow liquid to pass through the filter member but to allow gas to pass through the filter member, and a frame fixing the filter member, the filter member may have a wrinkled shape, and the frame may include a sealing member coupled to a periphery of the frame, which is close to the stack housing to prevent foreign substances from being introduced between a surface of the frame, which is close to the stack housing, and an outer surface of the stack housing.

In another example, the ventilation filter may further include a cover coupled to the frame to prevent the filter member from being exposed to the outside of the stack housing, and the cover may include an inlet hole through which air is introduced, and a shielding member provided to be spaced apart from a location corresponding to a location of the inlet hole and disposed at an inside of the inlet hole to prevent a flow path of liquid or foreign substances from being introduced into the inlet hole.

In another example, the fuel cell system may further include an air filter provided at the entrance of the air compressor to remove foreign substances contained in air supplied to the air compressor, and the ventilation pipe may connect the hollow and an entrance of the air filter.

In another example, the fuel cell system may further include a hydrogen measuring sensor provided in the interior of the stack housing to measure a concentration of hydrogen that is present in the hollow, and a controller configured to control an operation of the air compressor, and if an amount of hydrogen measured by the hydrogen measuring sensor exceeds a reference value, the controller may control the air compressor to be operated to remove hydrogen present in the hollow by ventilating the interior of the stack housing.

In accordance with another aspect of the present disclosure, there is provided a fuel cell stack housing including a body including a hollow for accommodating a fuel cell stack therein, a first hole provided in the body, the first hole to which a ventilation pipe connecting an entrance of an air compressor and the hollow for supplying air to the fuel cell stack is connected, and a vent hole provided in the body such that the hollow and an outside of the fuel cell stack housing communicate with each other, and an interior of the fuel cell stack housing may be ventilated by lowering of a pressure at the entrance of the air compressor, which is generated as the air compressor is operated, while air outside the body is suctioned into the entrance of the air compressor through the vent hole, the hollow, and the first hole.

In another example, the fuel cell stack housing of claim 12 may include a second hole, to which at least one branch pipe connecting the entrance of the air compressor and the hollow is connected, and a ventilation valve configured to open and close the second hole, and the ventilation valve opens the second hole if the air compressor is not operated, and closes the second hole if the air compressor is operated.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

Embodiment 1

Figure 1:
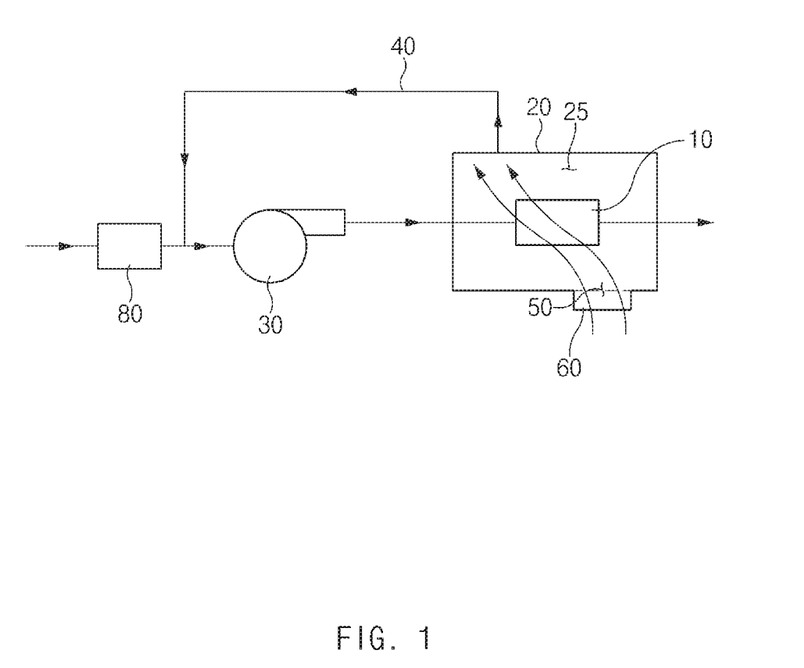
FIG. 1 is a diagram illustrating a state in which a fuel cell system according to a first embodiment of the present disclosure is operated.
Figure 2:
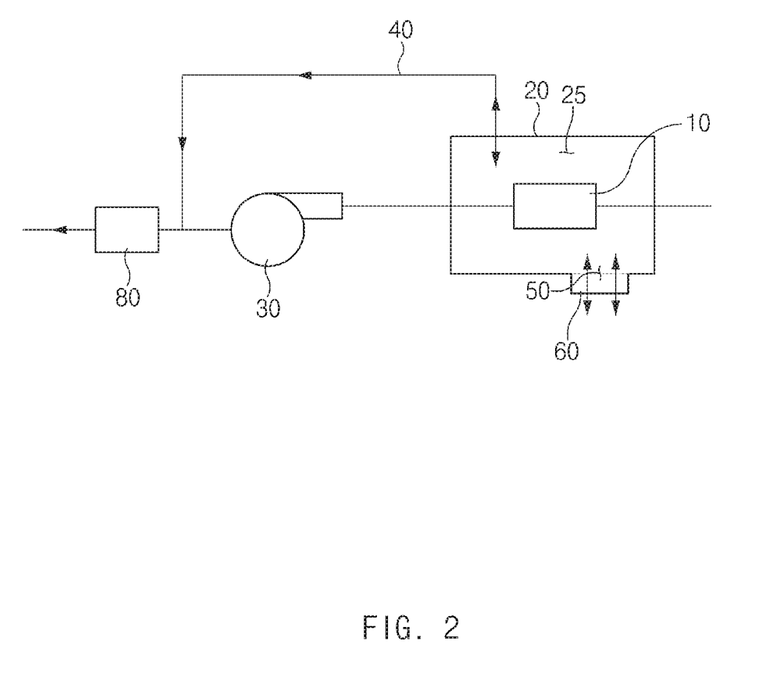
FIG. 2 is a diagram illustrating a state in which a fuel cell system according to a first embodiment of the present disclosure is stopped.

FIG. 1 is a diagram illustrating a state in which a fuel cell system according to a first embodiment of the present disclosure is operated. FIG. 2 is a diagram illustrating a state in which a fuel cell system according to a first embodiment of the present disclosure is stopped. Hereinafter, the fuel cell system according to the first embodiment of the present disclosure will be described with reference to FIGS. 1 and 2.

Referring to FIGS. 1 and 2, the fuel cell system according to the first embodiment of the present disclosure includes a fuel cell stack 10, a stack housing 20, an air compressor 30, a ventilation pipe 40, and a vent hole 50.

The fuel cell stack 10 includes an air electrode (not illustrated) and a fuel electrode (not illustrated). A hydrogen fuel supplied to the fuel electrode and air supplied to the air electrode may react with each other to generate electricity.

The stack housing 20 has a hollow 25 in the interior thereof. The fuel cell stack 10 is accommodated in the hollow 25. The stack housing 20 may prevent foreign substances from being introduced into the fuel cell stack 10.

The ventilation pipe 40 connects an entrance side of the air compressor 30 and the hollow 25. The ventilation pipe 40 is connected to a first hole (not illustrated) provided in the body. Further, the vent hole 50 is provided on an outer wall of the stack housing 20 such that the hollow 25 communicates with an outside of the stack housing 20. A plurality of vent holes 50 may be provided.

The configuration may prevent moisture in the interior of the stack housing 20 from being condensed. First, a process of preventing moisture from being condensed in the interior of the stack housing 20 when the fuel cell system is operated will be described in more detail.

The air compressor 30 pumps air to supply air to the air electrode. If the air compressor 30 is operated, a pressure at the entrance of the air compressor 30 is lowered by a suction force of the air compressor 30. If the pressure at the entrance of the air compressor 30 is lowered, air outside the stack housing 20 may be suctioned to the entrance of the air compressor 30.

In more detail, the ventilation pipe 40 (the first hole), the hollow 25, the vent hole 50, and the outside of the stack housing 20 communicate with each other, the air outside the stack housing 20 may be suctioned into the entrance of the air compressor 30 via the vent hole 50, the hollow 25, and the ventilation pipe 40 (the first hole) if the pressure at the entrance of the air compressor 30 is lowered.

Then, the air passing through the hollow 25 may ventilate the interior of the stack housing 20, and may prevent moisture from being condensed in the interior of the stack housing 20. Because an amount of air introduced may increase if the number of the vent holes 50 increases, a plurality of vents may be formed in the interior of the stack housing 20.

Then, the ventilation pipe 40 and the vent hole 50 may be located on opposite sides while the fuel cell stack 10 being interposed therebetween. Because the air introduced into the hollow flows between the vent hole 50 and the ventilation pipe 40, it may be preferable that the fuel cell stack 10 be located in a path along which air flows. Accordingly, because the ventilation pipe 40 and the vent hole 50 are located on opposite sides while the fuel cell stack 10 being interposed therebetween, exterior air passes by the fuel cell stack 10 while passing through the hollow 25.

The configuration may prevent moisture from being condensed in the interior of the stack housing 20 when the fuel cell system according to the first embodiment of the present disclosure is operated.

Further, air outside the stack housing 20 instead of the air supplied to the air electrode is suctioned for ventilation of the interior of the stack housing 20, the amount of air supplied to the fuel cell stack 10 is not reduced so that the performance of the fuel cell stack 10 may not be lowered.

Next, a process of preventing moisture from being condensed in the interior of the stack housing 20 when the fuel cell system is stopped will be described in more detail.

If the fuel cell system is stopped and the operation of the air compressor 30 is also stopped as illustrated in FIG. 2, the flow of the air that flows to the entrance of the air compressor 30 through the vent hole 50, the hollow 25, and the ventilation pipe 40 disappears.

However, it may flow between the outside and the inside of the stack housing 20 through the vent hole 50, and exterior air may be introduced into the hollow 25 in the interior of the stack housing 20 also through the ventilation pipe 40. Accordingly, the interior of the stack housing 20 may be ventilated, and moisture may be prevented from being condensed in the interior of the stack housing 20.

Meanwhile, the stack housing 20 is adapted to prevent foreign substances or liquid from being introduced from the outside into the fuel cell stack 10, and it is also necessary to prevent liquid and foreign substances from being introduced even when exterior air is introduced into the hollow 25 for ventilation.

Figure 3:
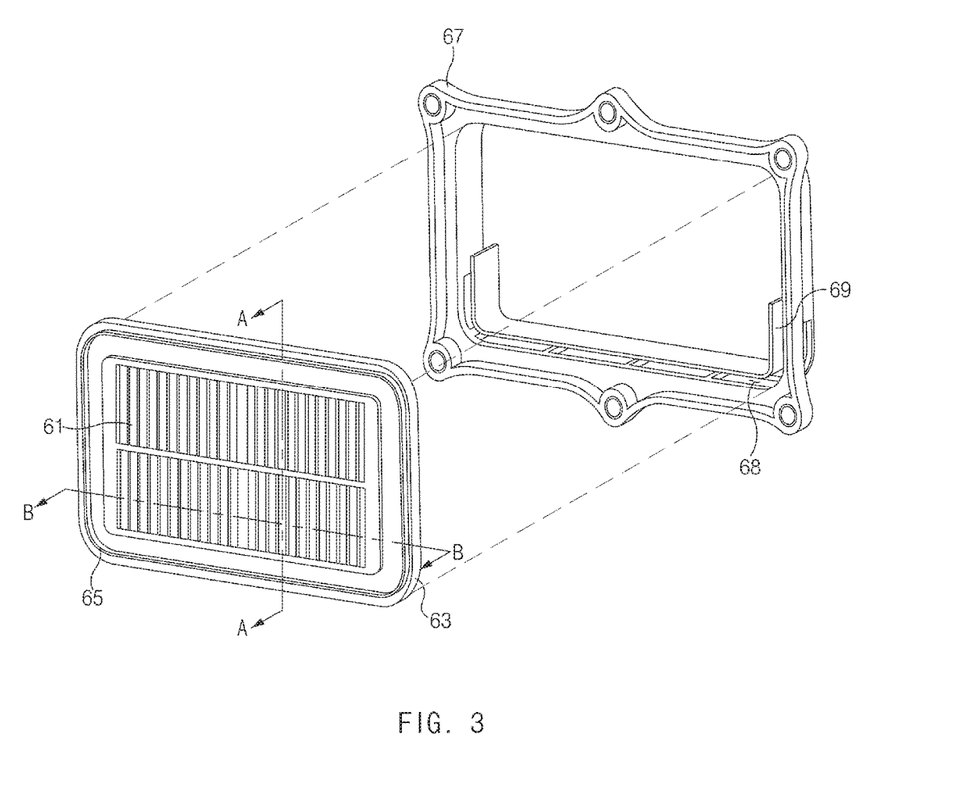
FIG. 3 is an exploded perspective view illustrating a ventilation filter of the present disclosure.
Figure 4:
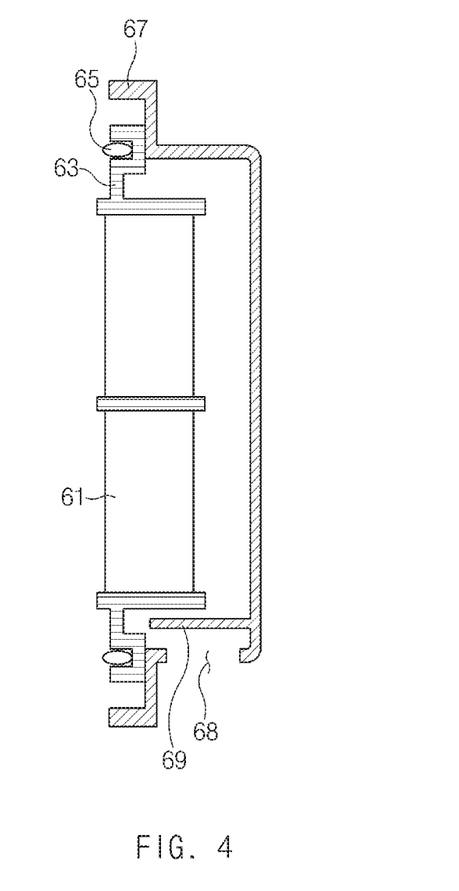
FIG. 4 is a plan view illustrating a section of the ventilation filter, taken along line A-A of FIG. 3.
Figure 5:
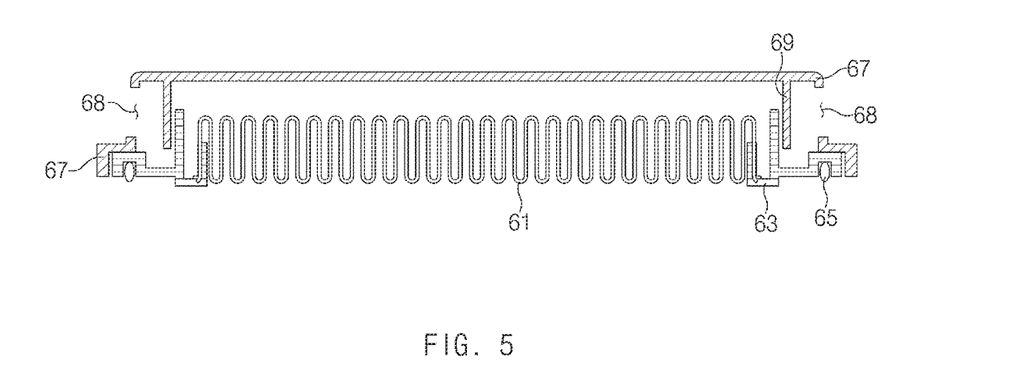
FIG. 5 is a side view illustrating a section of the ventilation filter, taken along line B-B of FIG. 3.

To achieve this, the fuel cell system according to an embodiment of the present disclosure may further include a ventilation filter 60. FIG. 3 is an exploded perspective view illustrating a ventilation filter of the present disclosure. FIG. 4 is a plan view illustrating a section of the ventilation filter, taken along line A-A of FIG. 3. FIG. 5 is a side view illustrating a section of the ventilation filter, taken along line B-B of FIG. 3.

Hereinafter, the ventilation filter 60 according embodiment of the present disclosure will be described in detail with reference to FIGS. 3 to 5.

The ventilation filter 60 may be coupled to the stack housing 20 at a location corresponding to the location of the vent hole 50. The ventilation filter 60 may prevent liquid and foreign substance from being introduced from the outside of the stack housing 20 to the hollow 25.

The ventilation filter 60 according to an embodiment of the present disclosure may include a filter member 61, a frame 63, a sealing member 65, and a cover 67.

The filter member 61 may pass gas while not passing liquid. Further, the expression that the liquid cannot pass through the filter member 61 means that a portion of the liquid may pass through the filter member 51 but most of the liquid does not pass through the filter member 61 and is filtered.

The filter member 61 may also prevent introduction of foreign substances. Accordingly, among the fluid passing through the filter member 61, the liquid and the foreign substance cannot be introduced into the hollow 25 but only air and humid air may be introduced into the hollow 25.

The filter member 61 may have a wrinkled shape. If the filter member 61 has a wrinkled shape, a larger amount of gas may be introduced into the hollow 25 as a contact area of the filter member 61, and the gas passing through the filter member 61 increases. Further, because foreign substances and liquid may be also filtered in a larger area, the life span of the fuel cell stack 10 may be extended.

The frame 63 may fix the filter member 61. The frame 63 is coupled to the stack housing 20 while fixing the filter member 61 such that the fluid introduced into the vent hole 50 may pass through the filter member 61.

Then, the frame 63 may further include a sealing member 65. In more detail, the sealing member 65 may be coupled to a periphery of the frame 63, which is close to the stack housing 20. The sealing member 65 may prevent foreign substances from being introduced between a surface of the frame 63, which is close to the stack housing 20, and an outer surface of the stack housing 20.

The cover 67 is coupled to the frame 63 and may prevent the filter member 61 from being exposed to the outside. That is, foreign substances and the like may be directly prevented from being introduced into the filter member 61.

Further, the cover 67 may include an inlet hole 68, through which air is introduced, to allow air to flow to the ventilation filter 60 when the frame 63 and the cover 67 are coupled to each other. Then, the inlet hole 68 may be provided only on one side of the cover 67. For example, as illustrated in FIGS. 3 to 5, the inlet hole 68 may be provided only at a lower end of the cover 67 to minimize introduction of foreign substances and liquid and allow introduction of gas to a degree.

Further, the cover 67 may further include a shielding member 69. The shielding member 69 may be provided to be spaced apart from a location corresponding to the location of the inlet hole 68 towards the inside of the cover 67 than inlet hole 68. The shielding member 69 may interrupt a flow path of the liquid or foreign substances introduced into the inlet hole 68.

That is, introduction of liquid or foreign substances may be prevented more certainly, by narrowing an interval of the inlet hole 68 to primarily prevent introduction of the liquid or the foreign substances and by secondarily interrupting a flow path of the liquid or foreign substances introduced with the shielding member 69 even if the liquid or foreign substances are introduced through the inlet hole 68.

As described above, the fuel cell system according to the first embodiment of the present disclosure may prevent moisture from being condensed in the interior of the stack housing 20, by introducing fluid, from which liquid and foreign substances from the outside are filtered into the interior of the stack housing 20 through the vent hole 50 or the ventilation filter 60, and ventilating the introduced air through the interior of the stack housing 20.

Embodiment 2

Figure 6:
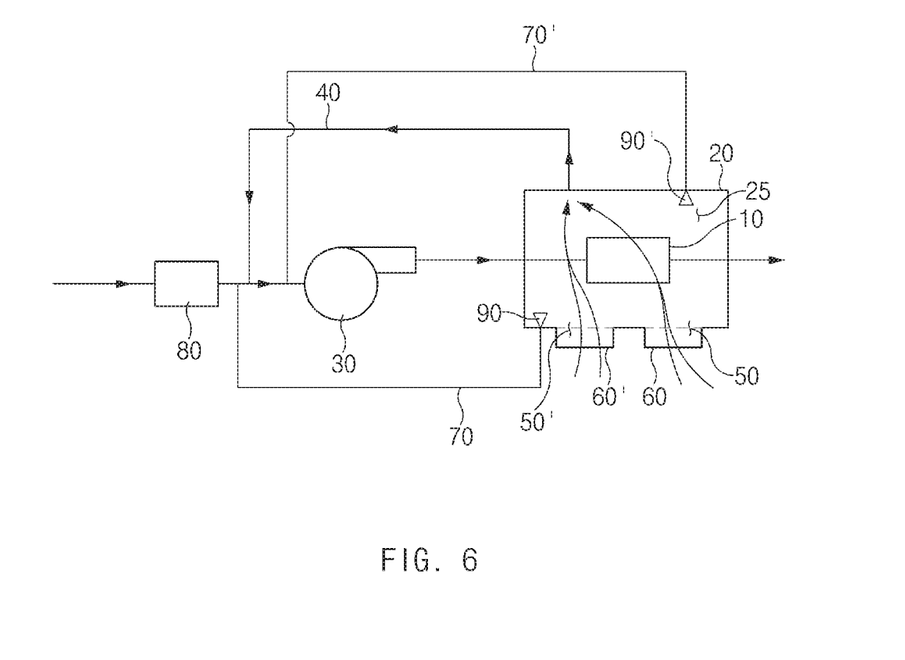
FIG. 6 is a diagram illustrating a state in which fuel cell system according to a second embodiment of the present disclosure is operated.
Figure 7:
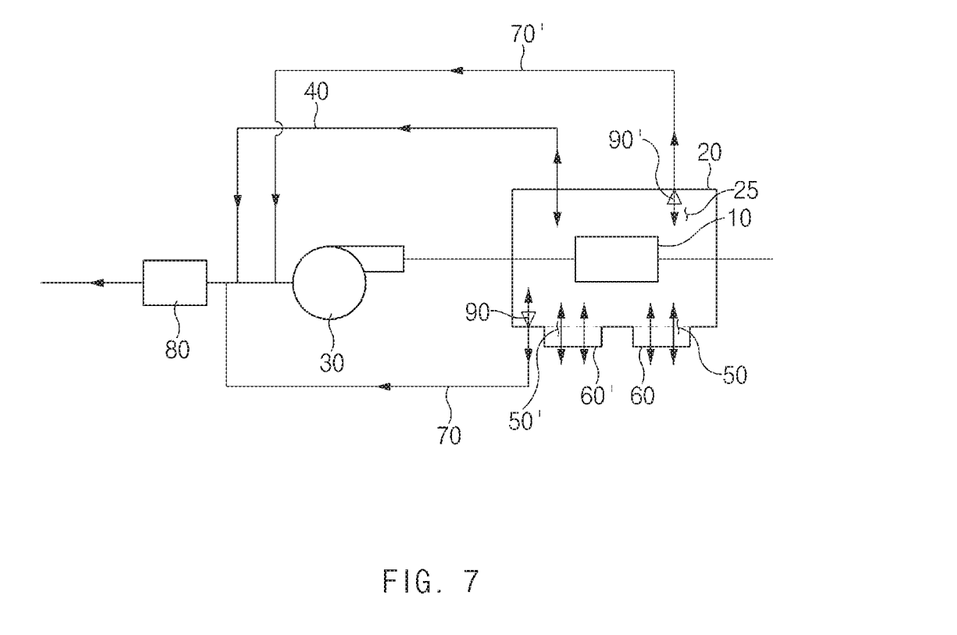
FIG. 7 is a diagram illustrating a state in which a fuel cell system according to the second embodiment of the present disclosure is stopped.
Figure 8:
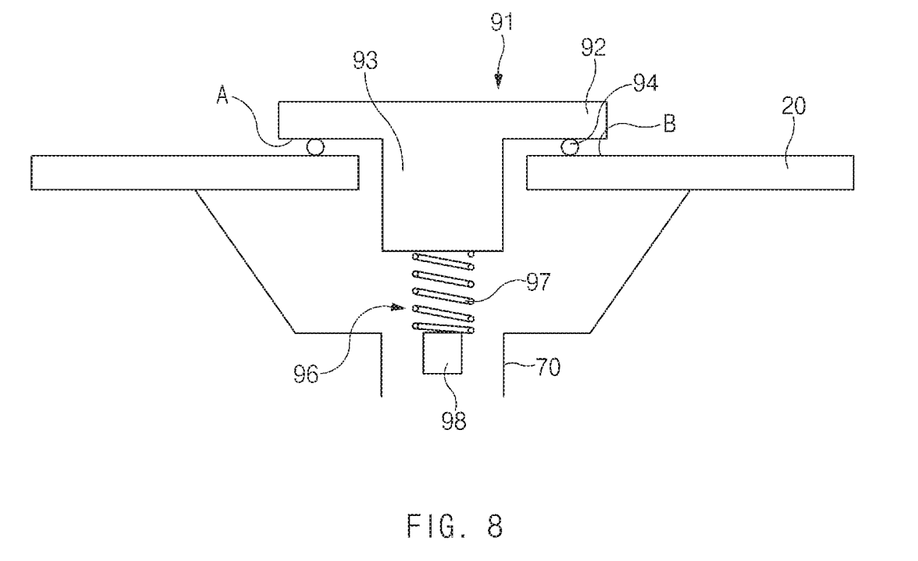
FIG. 8 is a view schematically illustrating a state in which a ventilation valve of the present disclosure closes a branch pipe.
Figure 9:
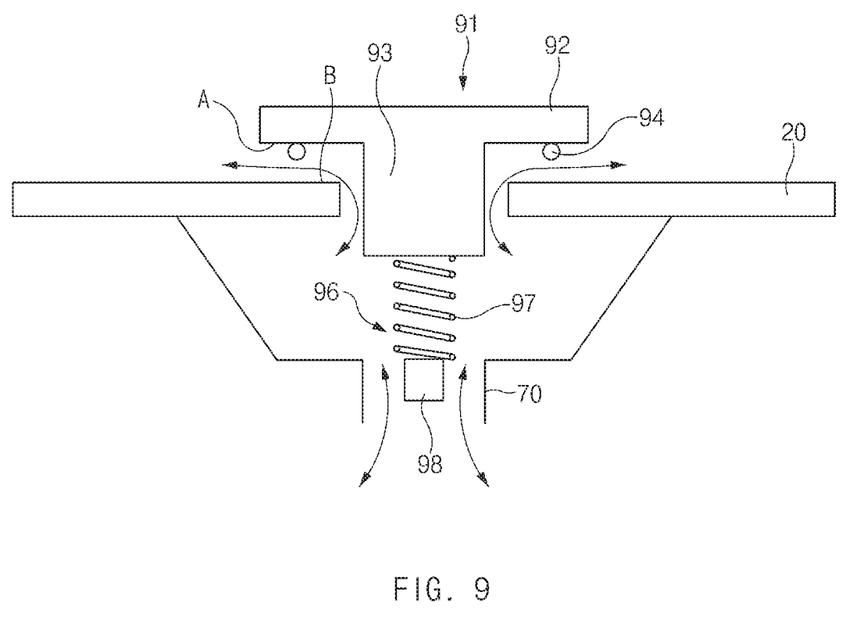
FIG. 9 is a view schematically illustrating a state in which the ventilation valve of the present disclosure opens the branch pipe.

FIG. 6 is a diagram illustrating a state in which a fuel cell system according to a second embodiment of the present disclosure is operated. FIG. 7 is a diagram illustrating a state in which a fuel cell system according to the second embodiment of the present disclosure is stopped. FIG. 8 is a view schematically illustrating a state in which a ventilation valve of the present disclosure closes a branch pipe. FIG. 9 is a view schematically illustrating a state in which the ventilation valve of the present disclosure opens the branch pipe. Hereinafter, the fuel cell system according to the second embodiment of the present disclosure will be described with reference to FIGS. 5 and 9.

The fuel cell system according, to the second embodiment of the present disclosure may further include at least one branch pipe 70 and a ventilation valve 90.

The branch pipe 70 connects an entrance side of the air compressor 30 and the hollow 25. The branch pipe 70 is connected to a second hole (not illustrated) provided in the body.

The ventilation valve 90 may be provided between the hollow 25 and the branch pipe 70 to open and close the branch pipe 70 (the second hole). The branch pipe 70 may be opened if the air compressor 30 is not operated, and the branch pipe 70 may be closed if the air compressor 30 is operated.

In more detail, if the air compressor 30 is operated while the fuel cell system is operated as in FIG. 6, the ventilation valve 90 may be moved towards the branch pipe 70 by lowering a pressure at the entrance of the air compressor 30 to close the branch pipe 70 (see FIG. 8). If the branch pipe 70 is closed, air outside of the stack housing 20 may flow along the ventilation filter 60, the vent hole 50, the hollow 25, and the ventilation pipe 40 and the interior of the stack housing 20 may be ventilated as in the first embodiment.

Further, when the operation of the fuel cell system is stopped as in FIG. 7, the ventilation valve 90 may move to a direction, which is opposite to a direction which the branch pipe 70 faces, to open the branch pipe 70 (see FIG. 9). Accordingly, because air may be introduced and discharged through the ventilation filter 60 or the vent hole 50 such that the interior of the stack housing 20 may be ventilated and the hollow 25 may communicate with the outside of the stack housing 20 also through the branch pipe 70 as in the first embodiment if the operation of the air compressor 30 is stopped, the interior of the stack housing 20 may be smoothly ventilated.

Hereinafter, the ventilation valve 90 will be described in more detail with reference to FIGS. 3 and 9. The ventilation valve 90 may include a closing part 91 and a restoring part 96.

First, the closing part 91 may be moved toward the branch pipe 70, by lowering of the pressure at the entrance of the air pressure 30 due to the operation of the air compressor 30. If the closing part 91 is moved towards the branch pipe 70, a passage between the branch pipe 70 and the hollow 25 may be closed.

In more detail, the closing part 91 may include a movable member 92, a pressed member 93, and an interruption member 94.

The movable member 92 may have a flat plate shape and may have a width that is larger than the width of the branch pipe 70. If the closing part 91 is moved towards the branch pipe 70 through the operation of the air compressor 30, the movable member 92 may close the passage between the branch pipe 70 and the hollow 25.

The pressed member 93 may extend from a vicinity of the center of the movable member 92 towards the branch pipe 70. For example, the pressed member 93 may extend to the interior of the branch pipe 70. The pressed member 93 may be a part that is supported by an elastic member, which will be described below.

The interruption member 94 may interrupt the passage between the branch pipe 70 and the hollow 25. That is, the interruption member 94 may prevent air from flowing between the movable member 92 and the stack housing 20. The interruption member 94 may be formed of rubber.

The interruption member 94 may be formed on a surface A of the movable member 92, which is close to the branch pipe 70, or may be formed in an area B of the inner surface of the stack housing 20, which meets the movable member 92 when the movable member 92 is moved towards the branch pipe 70. If the movable member 92 is moved towards the branch pipe 70, the interruption member 94 may be interposed between the surface A of the movable member 92, which is closed to the branch pipe 70, and the inner surface B of the stack housing 20, to prevent air from flowing through the passage between the branch pipe 70 and the hollow 25.

Next, the restoring part 96 may move the closing part 91 towards a direction that is opposite to the direction which faces the branch pipe 70 when the air compressor 30 is not operated. That is, when the operation of the fuel cell system is stopped, the branch pipe 70 may be opened by the restoring part 96.

In more detail, the restoring part 96 may include an elastic member 97 and a support member 98.

The elastic member 97 may be compressed or restored as the pressed member 93 is moved. If the air compressor 30 is operated, the pressed member 93 will be moved towards the branch pipe 70 and accordingly, the elastic member 97 may be compressed.

The support member 98 may be formed in the interior of the branch pipe 70 to support the elastic member 97 when the elastic member 97 is compressed. The shape of the support member 98 is not specifically limited. If the air compressor 30 is not operated, the resilient member 97 may be supported by the support member 98 to be restored, and the pressed member 93 may be restored to an original location by the restoring force of the elastic member 97 such that the branch pipe 70 is opened.

Through the configuration, the fuel cell system according to the second embodiment of the present disclosure may prevent moisture from being condensed in the interior of the stack housing 20 while the air outside the stack housing 20 is introduced into the entrance of the air compressor 30 when the fuel cell system is operated. Further, because the outside of the stack housing 20 and the hollow 25 may communicate with each other through the branch pipe 70 as well as the ventilation pipe 40, the vent hole 50, and the ventilation filter 60 when the operation of the fuel cell system is stopped, moisture may be prevented from being condensed in the interior of the stack housing 20 more effectively.

Further, a volatile organic composite may be generated from components of the fuel cell stack 10 during the operation of the fuel cell system, which may lower the performance of the fuel cell stack 10 temporarily or permanently. However, the fuel cell system according to the second embodiment of the present disclosure may prevent lowering of the performance of the fuel cell stack 10 by discharging the volatile organic composite to the outside of the stack housing 20 because the hollow 25 may communicate with the outside through the branch pipe 70 when the operation of the fuel cell system is stopped.

Further, when the air electrode of the fuel cell stack 10 is not properly sealed, the components of the fuel cell stack 10 may be corroded due to leakage of humid air or the air compressor 30 may be damaged as humid air is supplied to the air compressor 30, and corrosion of the fuel cell stack 10 or damage to the air compressor 30 may be reduced because the humid air may be also discharged to the outside when the operation of the fuel cell system is stopped.

Further, hydrogen that is lighter than air may be condensed in the stack housing 20 to be concentrated on an upper end of the stack housing 20, and may cause an explosion, which may be very dangerous. Accordingly, the fuel cell system according to the second embodiment of the present disclosure may further include a hydrogen measuring sensor (not illustrated) and a controller (not illustrated).

The hydrogen measuring sensor may be provided in the interior of the stack housing 20 to measure a concentration of hydrogen that is present in the hollow 25. Because hydrogen is so light as to be concentrated at an upper end of the stack housing 20, it is preferable that the hydrogen measuring sensor be provided at an upper end of the stack housing 20.

The controller may control an operation of the air compressor 30, and may control the air compressor 30 such that the air compressor 30 is operated if an amount of hydrogen measured by the hydrogen measuring sensor exceeds a reference value. Here, the reference value refers to a preset value by which an amount of hydrogen concentrated in the hollow 25 is determined to be dangerous.

The controller may control the air compressor 30 such that the air compressor 30 is operated, based on a value measured by the hydrogen measuring sensor to remove hydrogen that is present in the hollow 25 by ventilating the interior of the stack housing 20.

Because hydrogen may flow through the interior of the fuel cell stack 10 during the operation of the fuel cell system so that the hydrogen measuring sensor cannot measure an accurate value, it is preferable that hydrogen be discharged to the outside even when the operation of the fuel cell system is stopped. As the hollow 25 communicates with the outside through the branch pipe 70 when the operation of the fuel cell system is stopped, hydrogen may be discharged to the outside.

A plurality of branch pipes 70 and a plurality of ventilation valves 90 may be provided, and then ventilation may be performed more effectively.

Embodiment 3

Figure 10:
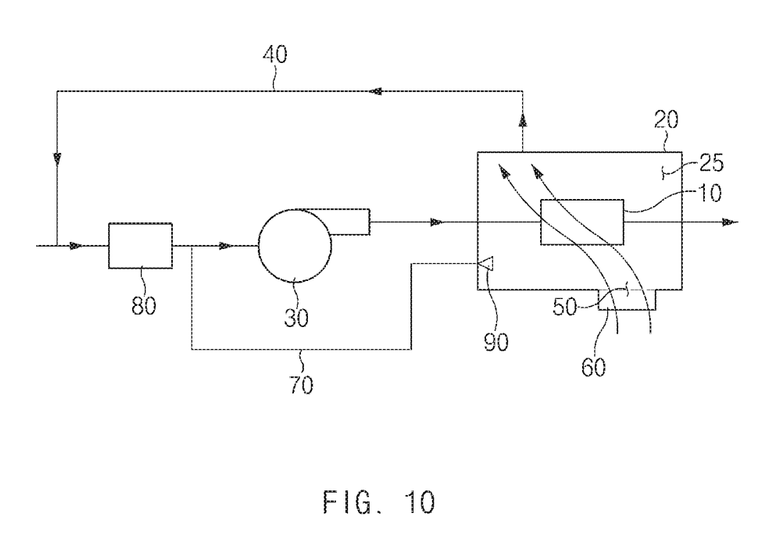
FIG. 10 is a diagram illustrating a fuel cell system according to a third embodiment of the present disclosure.

FIG. 10 is a diagram illustrating a fuel cell system according to a third embodiment of the present disclosure. Hereinafter, the fuel cell system according to the third embodiment of the present disclosure will be described with reference to FIG. 10.

The fuel cell system according to the third embodiment of the present disclosure may further include an air filter 80. The air filter 80 may remove foreign substances contained in air supplied to the air compressor 30. To achieve this, the air filter 80 may be provided at the entrance of the air compressor 30.

Further, the ventilation pipe 40 may be provided such that the hollow 25 and the entrance of the air filter 80 are connected to each other. When foreign substance are present in the interior of the stack housing 20 in advance or foreign substances fail to be filtered by the air filter 80 or the ventilation filter 50 to be introduced into the stack housing 20, the foreign substances may be supplied to the entrance of the air compressor 30 due to the operation of the air compressor 30, which may severely damage the air compressor 30. Accordingly, the foreign substances introduced into the entrance of the air compressor 30 through the ventilation pipe 40 may be introduced into the entrance of the air filter 80 first to be removed.

According to the present disclosure, moisture may be prevented from being condensed in the interior of the stack housing by ventilating the interior of the stack housing with exterior air.

Further, according to the present disclosure, moisture in the interior of the stack housing may be prevented from being condensed and hydrogen stacked in the interior of the stack housing may be discharged to the outside, by ventilating the interior of the stack housing with exterior air even when the operation of the fuel cell system is stopped.

The above description is a simple exemplification of the technical spirit of the present disclosure, and the present disclosure may be variously corrected and modified by those skilled in the art to which the present disclosure pertains without departing from the essential features of the present disclosure. Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A fuel cell system comprising:
   a fuel cell stack including an air electrode and a fuel electrode;
   a stack housing having a hollow therein to accommodate the fuel cell stack in the hollow;
   an air compressor configured to pump air to supply the air to the air electrode;
   a ventilation pipe connecting an entrance of the air compressor and the hollow; and
   at least one vent hole provided on an outer wall of the stack housing such that the hollow and an outside of the stack housing communicate with each other,
   wherein an interior of the stack housing is ventilated by lowering of a pressure at the entrance of the air compressor, which is generated as the air compressor is operated, while air outside the stack housing is suctioned into the entrance of the air compressor after passing through the vent hole, the hollow, and the ventilation pipe.

2. The fuel cell system of claim 1, further comprising:
   a ventilation filter coupled to the stack housing at location corresponding to a location of the vent hole,
   wherein the ventilation filter prevents liquid and foreign substances from being introduced from the outside of the stack housing to the hollow.

3. The fuel cell system of claim 2, wherein the ventilation filter includes:
   a filter member configured not to allow liquid to pass through the filter member but to allow gas to pass through the filter member; and
   a frame fixing the filter member,
   wherein the filter member has a wrinkled shape, and
   wherein the frame includes a sealing member coupled to a periphery of the frame, which is close to the stack housing to prevent foreign substances from being introduced between a surface of the frame, which is close to the stack housing, and an outer surface of the stack housing.

4. The fuel cell system of claim 3, wherein the ventilation filter further includes:
a cover coupled to the frame to prevent the filter member from being exposed to the outside of the stack housing, and
wherein the cover includes:
an inlet hole through which air is introduced; and
a shielding member provided to be spaced apart from a location corresponding to a location of the inlet hole and disposed at an inside of the inlet hole to prevent a flow path of liquid or foreign substances from being introduced into the inlet hole.

5. The fuel cell system of claim 1, wherein the ventilation pipe and the vent hole are located on opposite sides of the fuel cell stack while the fuel cell stack being located therebetween, such that exterior air passes by the fuel cell stack while passing through the hollow.

6. The fuel cell system of claim 1, further comprising:
at least one branch pipe connecting the entrance of the air compressor and the hollow; and
a ventilation valve provided between the hollow and the branch pipe to open and close a passage between the branch pipe and the hollow,
wherein the ventilation valve opens the passage if the air compressor is not operated, and closes the passage if the air compressor is operated.

7. The fuel cell system of claim 6, wherein the ventilation valve includes:
a closing part configured to move towards the branch pipe by lowering of the pressure at the entrance of the air compressor, which is generated as the air compressor is operated, to close the passage; and
a restoring part configured to move the closing part in a direction opposite to a direction, in which the closing part moves to close the passage, to open the passage if the air compressor is not operated.

8. The fuel cell system of claim 7, wherein the closing part includes:
a movable member having a flat plate-shape and having a width that is larger than a width of the branch pipe;
a pressed member extending from the movable member towards the branch pipe; and
an interruption member formed on a surface of the movable member, which is close to the branch pipe, or in an area of an inner surface of the stack housing, which meets the movable member when the movable member is moved towards the branch pipe, to interrupt the passage.

9. The fuel cell system of claim 8, wherein the restoring part includes:

a resilient member compressed as the pressed member is moved towards the branch pipe if the air compressor is operated, and restored if the air compressor is not operated to move the pressed member in the direction opposite to the direction in which the closing part moves to close the passage; and
a support member formed in an interior of the branch pipe to support the resilient member.

10. The fuel cell system of claim 1, further comprising:
an air filter provided at the entrance of the air compressor to remove foreign substances container in air supplied to the air compressor,
wherein the ventilation pipe connects the hollow and an entrance of the air filter.

11. The fuel cell system of claim 1, further comprising:
a hydrogen measuring sensor provided in the interior of the stack housing to measure a concentration of hydrogen that is present in the hollow; and
a controller configured to control an operation of the air compressor,
wherein, if an amount of hydrogen measured by the hydrogen measuring sensor exceeds a reference value, the controller controls the air compressor to be operated to remove hydrogen present in the hollow by ventilating the interior of the stack housing.

12. A fuel cell stack housing comprising:
a body including a hollow for accommodating a fuel cell stack therein;
a first hole provided in the body is connected to a ventilation pipe, wherein the ventilation pipe is connected to an entrance of an air compressor and the hollow for supplying air to the fuel cell stack; and
a vent hole provided in the body such that the hollow and an outside of the fuel cell stack housing communicate with each other,
wherein an interior of the fuel cell stack housing is ventilated by lowering of a pressure at the entrance of the air compressor, which is generated as the air compressor is operated, while air outside the body is suctioned into the entrance of the air compressor through the vent hole, the hollow, and the first hole.

13. The fuel cell stack housing of claim 12, further comprising:
a second hole, to which at least one branch pipe connecting the entrance of the air compressor and the hollow is connected; and
a ventilation valve configured to open and close the second hole,
wherein the ventilation valve opens the second hole if the air compressor is not operated, and closes the second hole if the air compressor is operated.

* * * * *